US010447807B1

(12) United States Patent
Earl et al.

(10) Patent No.: US 10,447,807 B1
(45) Date of Patent: Oct. 15, 2019

(54) DYNAMIC MIDDLEWARE SOURCE SELECTION FOR OPTIMIZING DATA RETRIEVAL FROM NETWORK NODES

(71) Applicant: Sprint Communications Company L.P., Overland Park, KS (US)

(72) Inventors: Bryson Earl, Altamonte Springs, FL (US); Stefan B. Naglee, Winter Park, FL (US); Seth T. Shelnutt, Winter Park, FL (US); Drew A. Shinholster, Jr., Orlando, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 166 days.

(21) Appl. No.: 15/711,958

(22) Filed: Sep. 21, 2017

(51) Int. Cl.
*H04L 12/00* (2006.01)
*H04L 29/08* (2006.01)
*G06F 11/34* (2006.01)
*H04W 24/00* (2009.01)
*H04W 8/00* (2009.01)

(52) U.S. Cl.
CPC .......... *H04L 67/32* (2013.01); *G06F 11/3476* (2013.01); *H04L 67/1095* (2013.01); *H04W 8/00* (2013.01); *H04W 24/00* (2013.01)

(58) Field of Classification Search
CPC ..... H04L 41/00; H04L 43/00; H04L 41/0654; H04L 69/40; H04L 41/0213; H04L 29/06; H04L 67/32; H04L 67/1095; H04W 24/00; H04W 8/00; G06F 11/3476

USPC ........ 709/218, 223, 224, 226; 707/637, 713, 707/715, 741; 370/216, 254; 714/26, 49
See application file for complete search history.

(56) References Cited

U.S. PATENT DOCUMENTS

| | | | | | |
|---|---|---|---|---|---|
| 5,448,724 | A | * | 9/1995 | Hayashi | .............. H04L 41/0213 714/4.1 |
| 5,805,820 | A | * | 9/1998 | Bellovin | ................. H04L 29/06 707/999.009 |
| 5,991,806 | A | * | 11/1999 | McHann, Jr. | ....... H04L 41/0213 709/224 |
| 6,006,016 | A | * | 12/1999 | Faigon | ................. G06F 11/2252 714/26 |
| 6,009,431 | A | * | 12/1999 | Anger | ................. H04L 41/0213 707/741 |
| 6,016,499 | A | * | 1/2000 | Ferguson | ............... G06F 16/252 |
| 6,026,442 | A | * | 2/2000 | Lewis | ..................... H04L 43/00 709/226 |
| 6,138,162 | A | * | 10/2000 | Pistriotto | ................. H04L 29/06 709/218 |
| 6,167,438 | A | * | 12/2000 | Yates | ..................... H04L 29/06 709/216 |

(Continued)

*Primary Examiner* — Frantz Coby

(57) ABSTRACT

A method for optimizing retrieval of node data from network nodes is disclosed. The method comprises obtaining, by a network server via a network, a node data set comprising node data from a plurality of middleware sources, where each of the plurality of middleware sources provides node data about the same network node. The network server is determining a fault in the node data received from one of the plurality of middleware sources, and identifying the middleware source associated with the fault. In response to determining the fault and middleware source, the network server is bypassing the middleware source associated with the fault and retrieving raw node data directly from an element management system associated with the network node.

20 Claims, 5 Drawing Sheets

(56) References Cited

U.S. PATENT DOCUMENTS

| | | | | | |
|---|---|---|---|---|---|
| 6,178,173 | B1* | 1/2001 | Mundwiler | | H04L 29/06 |
| | | | | | 370/410 |
| 6,189,038 | B1* | 2/2001 | Thompson | | H04L 41/0213 |
| | | | | | 709/231 |
| 6,226,788 | B1* | 5/2001 | Schoening | | H04L 41/0213 |
| | | | | | 709/203 |
| 6,253,339 | B1* | 6/2001 | Tse | | H04Q 3/0075 |
| | | | | | 370/216 |
| 6,256,739 | B1* | 7/2001 | Skopp | | G06F 21/31 |
| | | | | | 709/229 |
| 6,292,856 | B1* | 9/2001 | Marcotte | | G06F 13/102 |
| | | | | | 710/263 |
| 6,308,282 | B1* | 10/2001 | Huang | | H04L 69/40 |
| | | | | | 370/216 |
| 6,321,081 | B1* | 11/2001 | Lee | | H04W 24/00 |
| | | | | | 455/423 |
| 6,324,577 | B1* | 11/2001 | Hirai | | H04L 41/00 |
| | | | | | 370/254 |
| 6,363,411 | B1* | 3/2002 | Dugan | | H04M 3/42136 |
| | | | | | 379/201.01 |
| 6,378,128 | B1* | 4/2002 | Edelstein | | G06F 8/61 |
| | | | | | 709/221 |
| 6,499,117 | B1* | 12/2002 | Tanaka | | H04L 41/0654 |
| | | | | | 709/223 |
| 10,275,312 | B1* | 4/2019 | Barhate | | G06F 11/1088 |
| 2004/0255185 | A1* | 12/2004 | Fujiyama | | G06F 11/1482 |
| | | | | | 714/4.1 |
| 2007/0268819 | A1* | 11/2007 | Johansson | | G06F 11/004 |
| | | | | | 370/216 |

* cited by examiner

DYNAMIC MIDDLEWARE SOURCE SELECTION FOR OPTIMIZING DATA RETRIEVAL FROM NETWORK NODES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A cell site may be used as a network node to provide a wireless service to communicatively couple a user equipment (UE) and a mobile communication network. In some embodiments, cell sites can be elevated, mounted, or co-located with other communications equipment to provide service for a provider's wireless network according to particular location. A network node may be configured to support one or more wireless technologies and thus may be referred to according to the technology which it supports, such as being referred to an enhanced Node B (eNB) or base transceiver station (BTS). Embodiments of network nodes may vary and take differing form factors, such as independent elevated structures, including a structure for mounting and/or sheltering elements contained therein or attached thereto, such as a cabinet and/or tower. A network node may include a cell site having elements such as transceiver(s), antennas, transmitter(s), receiver(s), digital signal processor(s), router(s), electrical power source(s), control electronic(s), and power equipment.

SUMMARY

In an embodiment, a method for optimizing retrieval of node data from network nodes that include a cell site is disclosed. The method comprises obtaining, by a network server via a network, a node data set comprising node data from a plurality of middleware sources, where each of the plurality of middleware sources provides node data about the same network node. The method continues with determining, by the network server, a fault in the node data received from one of the plurality of middleware sources, and identifying, by the network server, the middleware source that is associated with the fault. In response to determining the fault and associated middleware source, the network server bypasses, via the network, the middleware source associated with the fault and retrieving raw node data directly from an element management system associated with the network node.

In an embodiment, another method for optimizing retrieval of node data from network nodes is disclosed. The method comprises receiving, by a network server communicatively coupled with a network, a node data set comprising node data from a plurality of middleware sources. The method includes determining, by the network server, a plurality of faults in the node data set, and identifying, by the network server, each middleware source associated with at least one of the plurality of faults. The method further comprises determining, by the network server, a historical frequency of faults in node data provided by the middleware source, and detecting, by the network server, that a threshold for the historical frequency of faults has been exceeded. In response to determining that a threshold for the historical frequency of faults has been exceeded, the network server bypass, via the network, each middleware source associated with a fault and retrieving raw node data directly from an element management system associated with a network node. The method includes redirecting, by the network server, at least one of the plurality of middleware sources to be a primary conduit for the network server to use in analysis of node data sets.

In an embodiment, another method for optimizing retrieval of data from network nodes is disclosed. The method comprises obtaining, by a network server communicatively coupled with a network, a plurality of node data sets from a plurality of middleware sources, where each of the plurality of node data sets comprise node data pertaining to a network node in the network. The method includes determining, by the network server, a fault in node data of at least one node data set. The method further comprises identifying, by the network server, the middleware source associated with the fault in at least one node data set and identifying an element management system that provided raw node data to the middleware source. Based on identifying, the network server is retrieving raw node data from the element management system associated with the network node while bypassing the middleware source associated with the fault. In response to retrieving the raw node data, the network server is redirecting an application to use at least one of the plurality of middleware sources as a primary conduit in analysis of node data sets.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
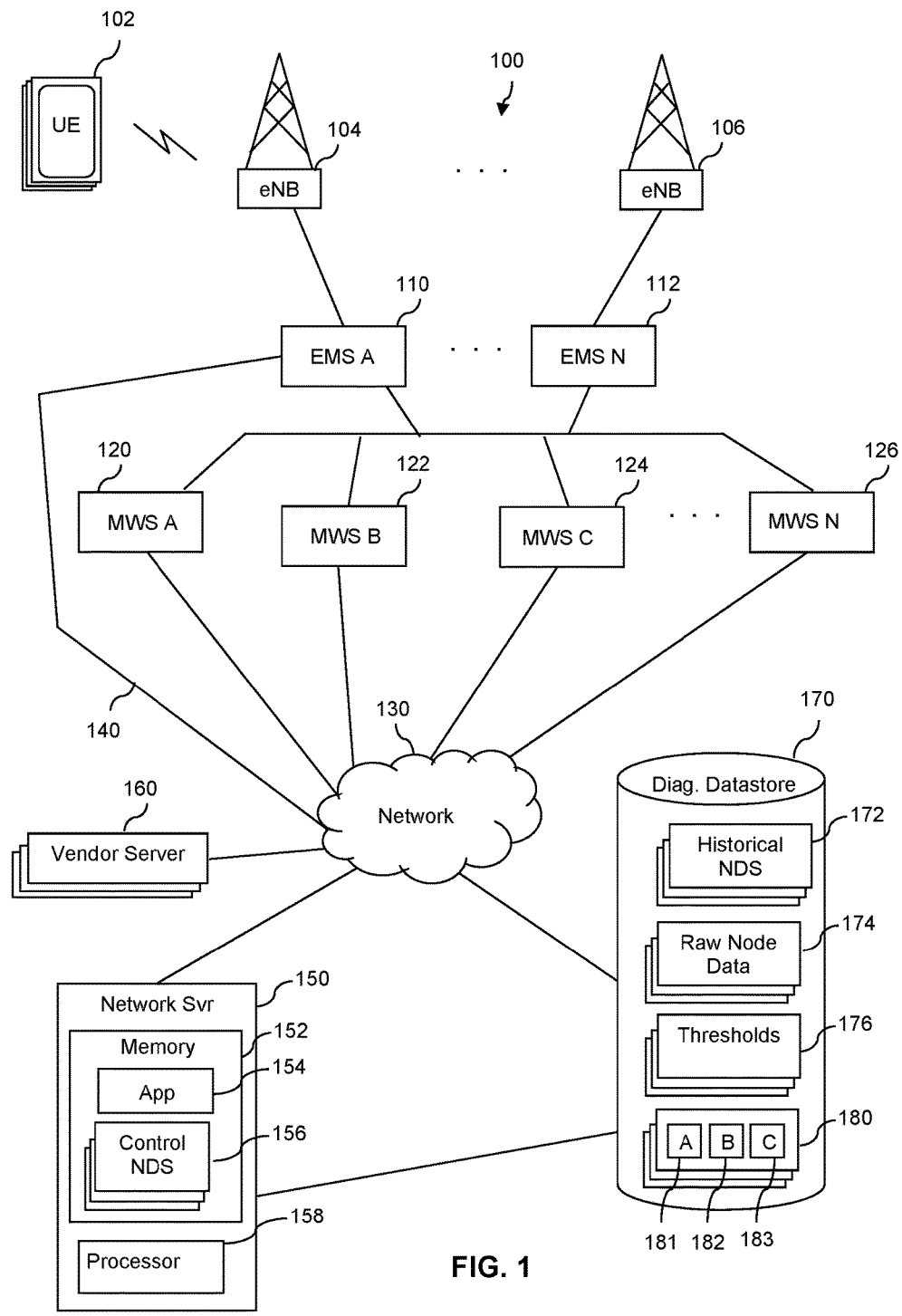
FIG. 1 is a diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Communication networks comprise network nodes, such as cell sites, to facilitate wired and wireless communication services among user equipment and backend servers. When user equipment (UE) (e.g., a mobile communication device) places a call or engages in data transfer via the network, the communications can travel through one or more network nodes (e.g., cell sites) towards its destination. To ensure that the network nodes (referred to hereafter as a "network node" or "nodes") are functioning properly (such as meeting quality of service parameters when handling data packets or providing a defined level of throughput), a server of the communication service provider may monitor the performance of the network by collecting operational and performance data about the nodes. In some embodiments, an element management system includes a computer system configured to create and collect raw node data about operations and performance metrics from one or more nodes via the network. With potentially hundreds or thousands of nodes in a network, the element management systems may create the raw node data as it becomes available from the elements within the node (e.g., identifying that a line card is processing a call that is using Long-Term Evolution (LTE) and how long the call is sustained), and store for later processing. The element management systems may be configured to (a)periodically (such as every five, ten, fifteen minutes, etc.) relay the raw node data to multiple middleware sources such that more than one middleware source may receive at least a portion of the same raw node data coming from a particular element management system.

The element management systems may be configured to report at least some of the same raw node data to more than one middleware source for redundancy and quality purposes in order to ensure that the network server(s) (which analyze the performance and operations of the nodes and communication network) are able to monitor the nodes should one of the middleware sources take longer to process the raw node data or become unavailable. Element management systems may be manufactured by different vendors with varying processing hardware and software, thereby increasing the potential for non-uniform reporting times of the raw node data to the middleware sources for transformation into node data sets. Each middleware source may be placed along a communication path in between the element management systems and thus be recognized as conduits for providing node data to the network server. A middleware source may comprise a particular machine, such as a back-end server, that is configured to perform an "ETL" process, which includes extracting raw node data from element management systems, transforming the raw node data into node data that may have a format for querying and analysis that is more efficiently read by a network server, and then loading the transformed node data sets into a data store accessible by a network server. Each middleware source may perform different ETL processes on the same raw node data, and provide the resulting output of node data to a network server.

In theory, the quality of the node data sets being produced by the middleware sources (i.e., output from each middleware source to the network server) should be substantially uniform across the middleware sources because the input of raw node data is at least partially overlapping. However, this is not always the case because the middleware sources may produce faults in the node data sets, such as data discontinuity (i.e., gaps in data), drops in data reporting, and time delays during transformation of the raw node data. The middleware sources may have varied transfer rates (i.e., how quickly a middleware source handles and transforms the raw node data into node data sets) and data discontinuity rates (i.e., the amount of gaps in the node data sets due to portions of raw node data not being transformed and thus not forming a continuous node data set) when compared to each other. In some embodiments, the node data received from middleware sources comprise faults (and thus non-uniformity in the node data) due to each of the middleware sources having different configurations and use of different application tools that may execute on different hardware and/or software platforms in a non-uniform manner.

For example, some middleware sources may be configured by virtual machines coupled to a physical hard disk drive, while another may be configured with a multicore processor and solid state drive which has greater processing and access speeds. Thus, in some embodiments, it may take longer for one middleware source to process the raw node data than another, or the time with which it takes for a middleware source to retrieve data is increased because it is operating on a virtual local area network. Faults may be caused by packets of raw node data being dropped and/or corrupted in transit to the middleware source. Irrespective of the cause of faults and non-uniformity across the middleware sources, the presence of faults in the node data sets (such as missing data, delays in reporting of portions or all of the node data sets, etc.) present technical challenges because discrepancies in the node data sets sent from different middleware sources may decrease the computing efficiency of the network servers to retrieve and analyze node data from each middleware source, thereby placing a burden on computer processing resources and increasing the time it takes for the network servers to detect malfunctions in the network.

Therefore, embodiments of the present disclosure provide systems and methods that dynamically select middleware sources to optimize retrieval and analysis of node data pertaining to network nodes. The network server may be configured by an application to monitor the quality of a node data set that has node data received from multiple middleware sources, identify the level of faults associated with the node data set, and provide independent verification of data quality by bypassing the middleware sources to retrieve raw node data from the element management system directly. This allows the network server to create a controlled information set to compare against what is produced by the middleware sources, and from this, select which middleware source most efficiently produces node data. This may optimize the quality of retrieval of data for network performance monitoring by providing dynamic selection of the middleware source that will serve as the primary conduit for providing node data to the network server for analysis. In some instances, the network server may use the selected middleware source for a defined period of time, and reevaluate whether another middleware source should be used instead upon expiration of the defined time period. Therefore, embodiments of the present disclosure can improve the functioning of the particular machines in the network and provide a more robust and reliable communication service by detecting potential data faults more quickly and taking action to optimize data retrieval and accuracy by selecting middleware sources that are reporting node data accurately, thereby improving network performance and customer experience on the network.

The preceding paragraphs are not intended to be limiting, but are illustrative of example benefits of the system and methods described by this disclosure according to some embodiments. Examples of systems and methods will now be described in more detail according to some embodiments of the present disclosure.

Turning now to FIG. 1, an embodiment of system 100 is illustrated. In an embodiment, system 100 comprises one or more user equipment (UE) 102, one or more network nodes, such as network node 104 through network node N 106, one or more element management systems, such as element management system A 110 through element management system N 112, and middleware sources, such as middleware source A 120, middleware source B 122, and middleware source C 124 through middleware source N 126. The system 100 may comprise network 130, one or more network servers 150, and diagnostic data store 170. The UE 102 may be configured to communicate with network 130 via at least one network node, such as network node 104. The network nodes 104, 106 may be communicatively coupled to at least one element management system, such as element management systems 110, 112, respectively. In some embodiments, network nodes 104, 106, element management systems 110, 112 and middleware sources 120, 122, 124, 126 may be comprised within network 130 that is associated with a communication service provider. Put simply, in some embodiments, the network nodes 104, 106, element management systems, 110, 112, and middleware sources 120-126 may be a portion of network 130 operable to provide and/or support communication services for a communication service provider associated with the network 130 and network server 150.

Embodiments of network 130 may comprise a public network, private network, wired network, wireless network, internet protocol network, core network, radio access network, or any combination thereof and comply with standards of one or more wireless protocols. In an embodiment, the UE 102 may include a variety of form factors, such as any of a mobile phone (including smart phones), tablet computer, wearable computing device, digital media player, electronic book readers, notebook computer, a personal computer having an integrated or external wireless network communication device, game platforms, or other non-generic devices that may be configured for wired and/or wireless communication. It is understood that, in some embodiments, the total number of UE 102, network nodes 104, 106, element management systems 110, 112, and middleware sources 120-126 may greater than the number of devices illustrated in FIG. 1 and/or may be combined into fewer devices than illustrated in FIG. 1.

In an embodiment, at least one of the network nodes 104,106 comprises a cell site that is configured to provide a wireless communication link(s) to and from at least the UE 102 according to at least one wireless communication standard, such as Long Term Evolution (LTE), Worldwide Interoperability for Microwave Access (WiMAX), High Speed Packet Access (HSPA), Code Division Multiple Access (CDMA), Global System for Mobile Communication (GSM), Bluetooth®, Wi-Fi, or any combination thereof. A network node 104 may, in some embodiments, be referred to according to the technology with which it supports, such as being referred to an enhanced Node B (eNB) for corresponding to an LTE technology, a base transceiver station (BTS) for corresponding to a GSM technology, or another type of edge node used in wireless communications. In some embodiments, one or more network nodes 104, 106 may comprise elements that facilitate wireless communication, and the elements may be distributed in a location and/or co-located in physical structures of the network 130 that are separate from other elements, but communicatively coupled wired and/or wirelessly to collectively comprise the network node.

An element management system, such as 104, 106, may be implemented via a computer system having non-transitory memory and processors configured by application(s) for managing network nodes 104, 106, specifically facilitating functions such as fault management, data accounting, generation of performance data, and access security. In some embodiments, each element management system 104, 106 is associated with a different vendor that is separate from the communication service provider associated with network server 150. By one or more UE 102 communicating with network nodes 104, 106, raw node data 174 may be generated at the element management systems 110, 112 and initially stored in memory. In some embodiments, raw node data 174 is copied to diagnostic data store 170. Irrespective of where it is currently stored, the raw node data 174 may be in a format that is not easily structured for querying and analysis by the network server 150. Thus, the raw node data 174 may undergo a transformation into one or more processed node data (referred to herein as "node data") (e.g., node data 181-183). The node data (e.g., node data 181-183) may be based on the same raw node data 174, and be comprised in a node data set 180.

It is understood that there may exist multiple instances of raw node data 174, with each instance corresponding to one of the network nodes 104, 106. Raw node data 174 may comprise operational data and/or performance data related to the communication service provided by the corresponding network node 104, 106. Examples of operational data include, but are not limited to, metrics for rate of data transfer for a particular wireless technology (e.g., LTE data rate associated with a particular UE 102) for one of the network nodes 104, 106, and call management data (e.g., how long a call or data transfer occurred prior to termination of the call). Examples of performance data include, but are not limited to, the volume of calls and/or messages exchanged over a defined period (e.g., number of calls handled per day), type of communication technology provided (e.g., LTE, GSM, Wi-Fi, etc.), identifiers of UE's, hardware, and/or software associated with the communication handled by the network node, frequency of dropped calls and/or dropped data packets, and amount of available memory and/or processor resources consumed by the network node. The raw node data 174 associated with each network node 104, 106 may comprise time stamps corresponding to the time that a communication occurred via the network node 104, 106 and when the raw node data 174 was provided to at least one of the element management systems 110-112. In some embodiments, the network server 150 may correlate the information it receives with a particular network node 104, 106 based on a network node identifier and/or time stamp included with raw node data (and subsequently the processed node data) that is provided from a network node 104, 106 to one of the element management systems 110-112, and then to the diagnostic data store 170 once processed.

Each element management system 110, 112 may be disposed along communication paths between a network node (such as network nodes 104, 106) and one or more middleware sources 120, 122, 124, 126, such as illustrated in FIG. 1. In some embodiments, each element management system 104, 106 is configured to generate, compile, and transmit the same raw node data about network nodes 104, 106 to multiple middleware sources, such as any of middleware sources 120, 122, 146, 126, so that each of the middleware sources may receive at least a portion of raw node data 174 that pertains to the same network node. Put simply, at least some of the same raw node data 174 is sent to multiple middleware sources 120-126 for redundancy and so that the middleware sources 120-126 may concurrently and/or consecutively process the raw node data 174 into node data sets (e.g. 181-183) for later analysis by the network server 150.

The system 100 includes a plurality of middleware sources, such as middleware source A 120, middleware source B 122, and middleware source C 124. In some embodiments, the plurality of middleware sources continues through middleware source N 126, which represents a defined number selected by the communication service provider associated with network 130 and network server 150. Each of the middleware sources 120-124 may each include a server that is a computer system configured as a particular machine, such as the computer systems discussed herein. Each middleware source 120-124 may be associated with different vendors, and as such, be configured by different applications that each process raw node data 174 uniquely. Each of the middleware sources 120-124 is configured to extract raw node data from an element management system 110, 112, and transform the raw node data 174 into processed node data that pertains to the same network node, such as node data A 181 (sent by middleware source A 120), node data B 182 (sent by middleware source B 122), and node data C 183 (sent by middleware source B 124) each pertaining to the same network node (e.g. cell site 104).

For example, element management system A 110 may generate raw node data 174 pertaining to network node 104. The raw node data 174 is sent to each of middleware source A 120, middleware source B 122, and middleware source C 124. In some embodiments, the raw node data 174 is time stamped and compiled into a file for transmission to the middleware sources 120-124. The format of raw node data 174 may include data structures for relational databases, extensible markup language (XML) and flat files, but may also (or alternatively) include non-relational database structures such as Information Management System (IMS) or other data structures such as Virtual Storage Access Method (VSAM) or Indexed Sequential Access Method (ISAM). Each of the middleware sources 120-124 independently extract the raw node data 174 sent by the element management system (e.g., 110). In some embodiments, extraction may include raw node data validation to confirm whether the raw node data 174 received and/or pulled from the source (i.e., one of the element management systems 110, 112) has the correct (i.e., expected) values in a given domain (such as a pattern/default or list of values determined by comparison with a file in memory). If the raw node data 174 fails the validation rules, it may be rejected and/or cause faults to be produced. In some embodiments, when one of the middleware sources 120-124 rejects any part of the raw node data 174, the middleware source may produce a fault in the resulting node data (i.e., node data 181-183) because of a "gap" (i.e., data discontinuity) due to the rejection of data. The amount of faults (e.g., gaps) in node data (e.g., one of 181, 182, 183 within node data set 180) may be more prevalent when coming from one of the middleware sources (e.g., middleware source A 120) compared to a different middleware source (e.g., middleware source B 122 or middleware source C 124) due to middleware source A 120 rejecting more incoming raw node data 174 than the other middleware sources (e.g., middleware source B 122 and middleware source C 124).

With raw node data 174 extracted, each middleware source 120-124 may then transform the raw node data 174 by performing a unique combination of functions, such as but not limited to any of: selecting only certain columns to load from the raw node data 174; translating and encoding values; deriving a new calculated value; sorting or ordering the raw node data 174 based on a list of columns to improve search performance; aggregating multiple rows of data; transposing or pivoting (e.g., turning multiple columns into multiple rows or vice versa); splitting a column into multiple columns (e.g., converting a comma-separated list, specified as a string in one column, into individual values in different columns); disaggregating repeating columns; looking up and validating the relevant data from tables or referential files; or applying any form of data validation. In some embodiments, network server 150 may transform raw node data 174 that was obtained directly from an element management system (e.g., element management system A 110). The network server 150 may transform raw node data 174 into a control node data set 156 by performing one or more of the functions above. The control node data set 156 may be used to compare with a node data set (e.g., 180) and the node data comprised therein from each of the middleware sources, such as node data 181-183 from middleware sources 120-124.

In some embodiments, any of the above transformations may result in faults, such as when one of the middleware sources 120-124 parses raw node data 174 that it does not recognize, and subsequently rejects some or all of it, thereby leaving a data discontinuity (i.e., gap in the data), thereby indicating a fault. For the same raw node data 174 associated with one of the network nodes (e.g., 104), the resulting frequency of faults may be different in each of node data A 181 produced by middleware source A 120, node data B 182 produced by middleware source B 122, and node data C produced by middleware source C 124. Once transformed, each of node data 181, 182, 183 (which may be collectively comprised within a data structure referred to as a node data set associated with a network node) are sent from their respective middleware sources 120, 122, 124, and loaded into the non-transitory memory of diagnostic data store 170 and/or memory of network server 150. In some embodiments, the applications that execute on each of the middleware sources 120-124 to perform the processing of raw node data 174 into processed node data (e.g., node data 181-183) may be referred to as an extraction, transform, and load (ETL) tool and are stored and executed from memory.

The system 100 may further comprise one or more network server(s) 150 and diagnostic data store 170 which are communicatively coupled to the network 130 and middleware sources 120-126. The network server 150 may be configured by an application 154 stored in non-transitory memory 152 via execution of a processor(s) 158. Thus, the processor(s) 158 are configured by application 154 to perform the features discussed herein. In some embodiments, at least some of the configuration and functionality of network server 150 discussed herein is caused by the application 154 and features disclosed herein. In some embodiments, the diagnostic data store 170 may be comprised within network server 150 and/or be distributed memory accessible via network 130. The diagnostic data store 170 may be accessible by the network server 150 via a direct connection and/or indirect connection, such as via network 130. In some embodiments, the diagnostic data store 170 may comprise historical node data sets 172, instances of raw node data 174, and node data sets 181-183 which are associated with one of the network nodes 104, 106. It is understood that network server 150 may access diagnostic data store 170 to obtain a plurality of node data sets, such as node data set 180 comprising node data 181-183.

In some embodiments, the network server 150 compiles and stores the plurality of node data 181-183 into a node data set 180, and identifies the node data set 180 as being associated with a particular network node (e.g., cell site 104). For example, node data 181-183 may each be associated with network node 104 and element management system 110. In some embodiments, node data 181-183 each comprise one or more identifiers corresponding to a network node (e.g., cell site 104) and/or an element management system (e.g., element management system A 110). The plurality of node data 181-183 may each include at least one time stamp corresponding to the time raw node data was created at the network node to which it pertains (e.g., cell site 104), a time stamp generated by the middleware source that performed an ETL process on it (e.g., one of middleware sources 120-124), and a time stamp corresponding to the arrival time that the node data (e.g., one of node data 181-183) was loaded into the diagnostic data store 170 for access by the network server 150.

Each element management system 110, 112 may have different access requirements, such as different logins with each login being over a defined character length (e.g., ten characters in length). Thus, in some embodiments, a network server 150 may be configured to identify an element management system (e.g., one of 110, 112) via an identifier in a node data set and/or from a lookup table in diagnostic data store 170 and generate a key to access the memory of the element management system to retrieve raw node data 174 stored therein. In some embodiments, this may facilitate access to the raw node data 174 by the network server 150 while bypassing middleware sources 120-124. By this, the network server 150 may obtain raw node data 174 directly from a particular element management system 120-124 via use of the generated key, and retrieve raw node data 174 without at least one of the middleware sources 120-126 serving as an intermediary. Once retrieved directly from at least one of the element management systems 110, 112, the raw node data 174 may be stored in non-transitory memory of diagnostic data store 170, and the network server 150 may transform the raw node data 174 into a control node data set 156 for comparison.

Figure 2:
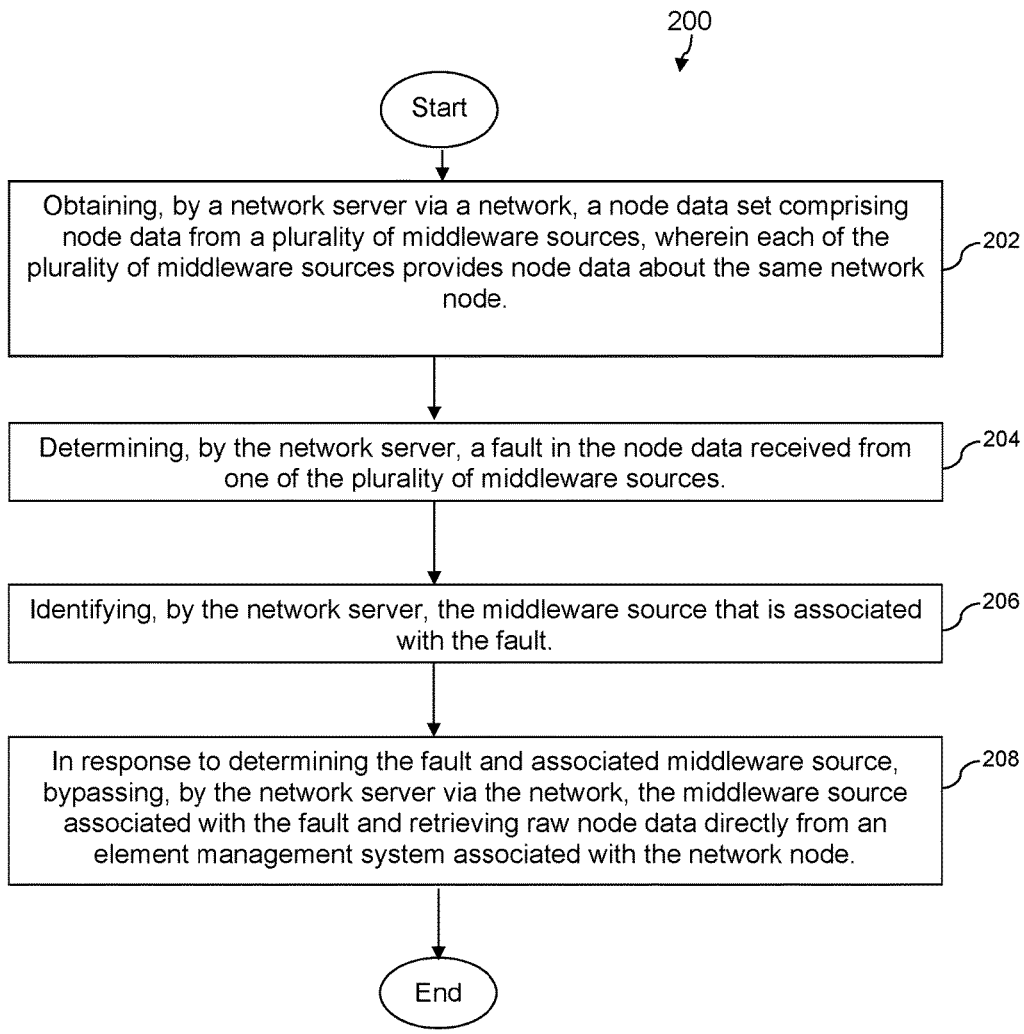
FIG. 2 illustrates a method according to an embodiment of the disclosure.
Figure 3:
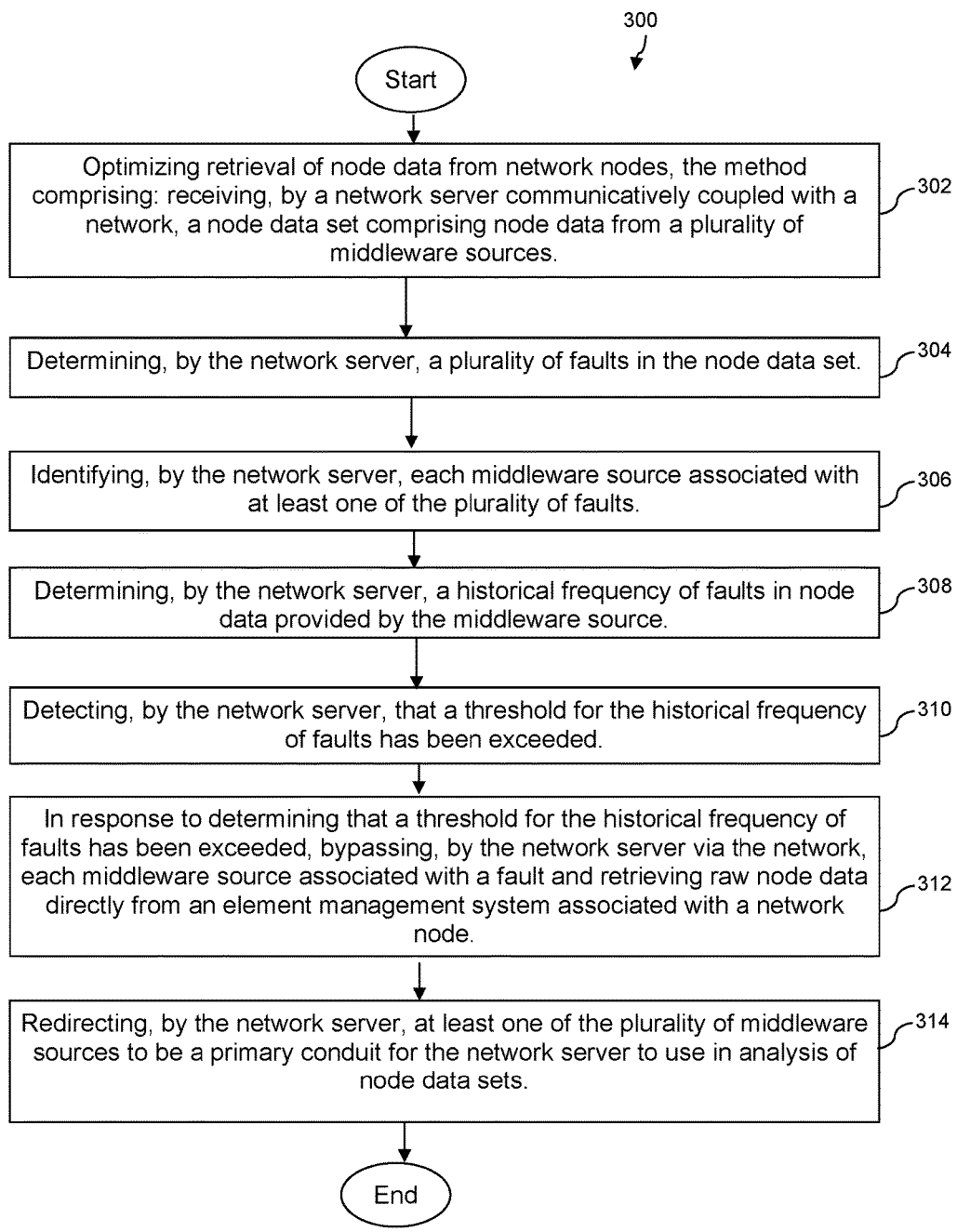
FIG. 3 illustrates a method according to another embodiment of the disclosure.
Figure 4:
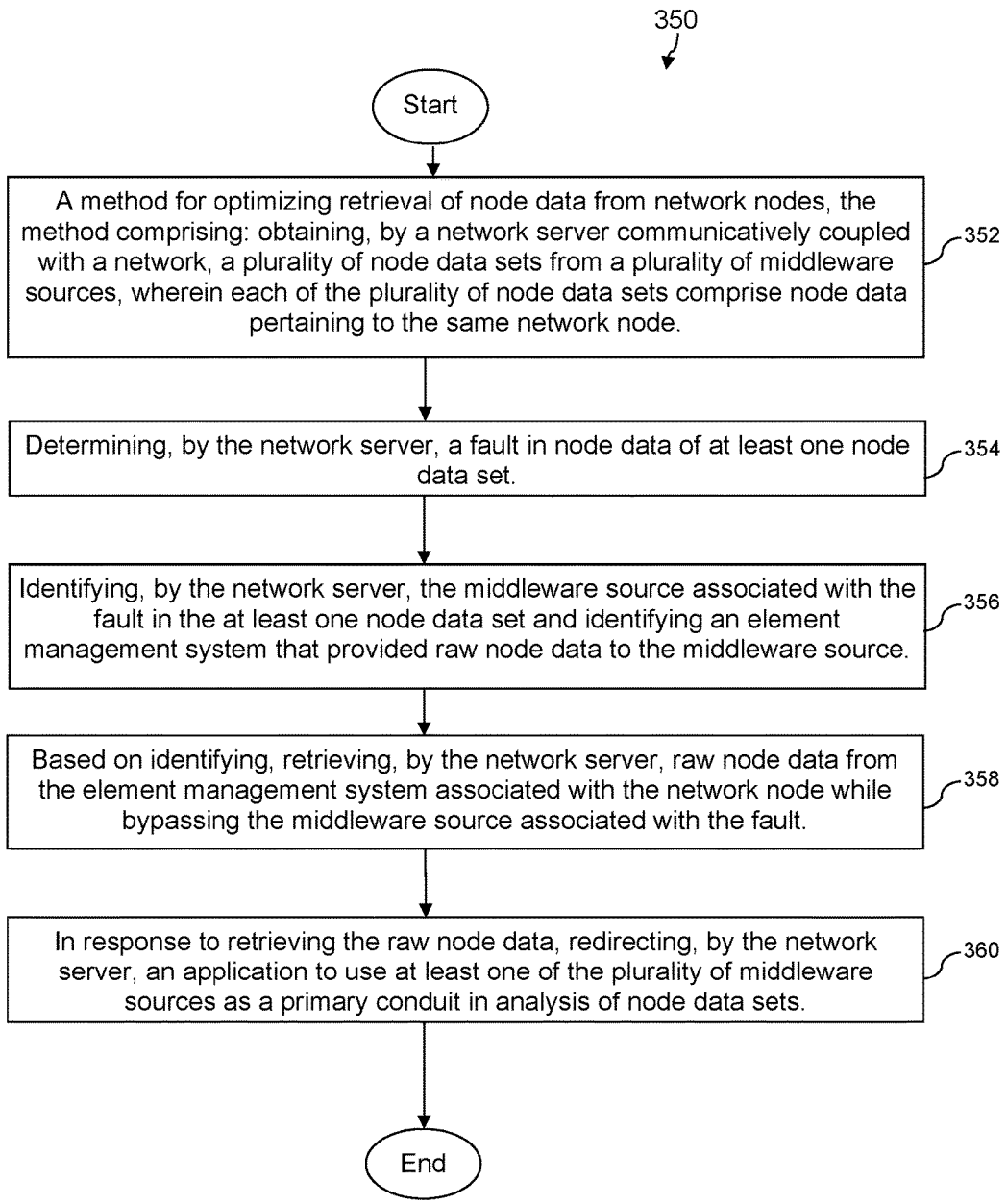
FIG. 4 illustrates a method according to another embodiment of the disclosure.

FIGS. 2, 3, and 4 are flowcharts of example method 200, 300, and 350, respectively, for optimizing retrieval of node data from network nodes. The methods 200, 300, and 350 may be implemented, in whole or in part, as algorithms executed by embodiments of devices disclosed herein, such as network server 150 of system 100 of FIG. 1, or another suitable non-generic device and/or non-generic system such as discussed with respect to FIG. 5. For this and other processes and methods disclosed herein, the operations performed in the processes and methods may be implemented in differing order. Furthermore, the outlined operations are only provided as examples, and some of the operations may be optional, combined into fewer operations, supplemented with other operations, or expanded into additional operations without detracting from the essence of the disclosed implementations.

Turning now to FIG. 2 with reference to features of FIG. 1, a method 200 for optimizing retrieval of node data from network nodes is disclosed. At step 202, the method 200 comprises obtaining, by a network server via a network, a node data set comprising node data from a plurality of middleware sources. For example, network server 150 may obtain node data set 180 from diagnostic data store 170. The node data set 180 comprises node data 181, 182, 183 from each of the plurality of middleware sources, such as middleware source A 120, middleware source B 122, and middleware source C 124, respectively. The node data 181, 182, 183 may be a result from each middleware source 120, 122, 124 processing the same raw node data sent by element management system A 110. In turn, the element management system A 110 may have received and/or generated raw node data about a cell site, such as eNB 104, and thus each of the plurality of middleware sources 120, 122, 124 can provide node data about the same network node, such as eNB 104. In an embodiment, a network node may comprise a cell site (e.g., eNB 104), and each middleware source (e.g., middleware source A 120, middleware source B 122, and middleware source C 124), may include a computer server that is transforming raw node data (e.g., 174) into node data (e.g., 181, 182, 183) that is loaded into the node data set (e.g., 180) for the network server (e.g., 150).

At step 204, the method 200 continues with the network server determining a fault in the node data set received from one of the plurality of middleware sources. For example, the network server 150 may analyze node data 181, 182, 183 within node data set 180 and discover that node data 181 shows one or more faults. In an embodiment, a fault may correspond to at least one of: a gap in data continuity about the network node, an indication of a middleware source exceeding a time threshold for processing and reporting node data to the network server, or a combination thereof. Thus, node data A 181 may have one or more gaps in data continuity after middleware source A 120 performed an ETL process on the raw data received from element management system A 110. The amount of faults—in this example, number of gaps in node data A 181—may be greater than the number of gaps that are present in node data B 182 and/or node data 183. The analysis may be performed by the network server accessing the node data set 180, counting the number of faults present in each of node data 181, 182, 183 and ranking the amount of faults in ascending and/or descending order. In some embodiments, the network server updates the node data set with node data received from each middleware source after a defined time period. For example, the defined time period may be in fifteen and/or sixty minute intervals, and therefore new node data may be populated into the node data set, such as by appending the new node data and/or overwriting node data previously stored.

At step 206, the method 200 continues with the network server identifying the middleware source that is associated with the fault. For example, once the network server 150 determines that a fault exists in node data A 181 of the node data set 180, the network server may reference an identifier of node data A 181 and map the identifier to the identity of middleware source A 120. In some embodiments, the network server may identify the number of faults in node data set 180 for each middleware source that provided node data for the node data set. In some embodiments, the network server may identify an element management system associated with the node data set, such as element management system A 110 associated with node data set 180. The network server may also obtain and/or generate a key to access the element management system. In some embodiments, the key may be a define string of characters known to both the element management system and the network server. Based on the key, the network server may access memory of the element management system to obtain raw node data, where the raw node data corresponds and identifies a particular network node, such as eNB 104.

In some embodiments, additional steps may include comparing, by the network server, an arrival time of when node data arrives at the network server from the middleware sources with a sent time of when node data was sent to the middleware sources from the element management system. For example, raw node data 174 may originally be generated by element management system A 110 based on communication activity on eNB 104. The raw node data 174 may be distributed by element management system A 110 to multiple middleware sources, such as each of middleware sources 120-124. The raw node data may include a time stamp (e.g., a sent time stamp) indicating when the element management system sent the raw data to each of the middleware sources. After each of the middleware sources 120-124 individually performs an ETL process on the raw node data, transformed data (i.e., node data) may include a second time stamp corresponding to how long the transformation took, and when the node data is sent from the middleware source to the network server 150 and/or diagnostic data store 170, a time stamp corresponding to the arrival of the node data may be appended to the node data set. By this, a time differential may be calculated so as to reveal which middleware source provides node data the quickest and/or slowest. In some embodiments, the network server may determine the speed with which node data is accessed and processed based on the time differential. A weighted value may be applied to the time differential so that the network server can factor how quickly the node data is processed relative to how many faults are produced. Thus, in some embodiments, although one middleware source may provide slightly less faults (e.g., 5% less faults than all other middleware sources), the network server may also determine that it takes this middleware source 30% longer (based on each of the time differentials calculated) to achieve this result. Thus, the network server may, in some embodiments, average the time differential with the number of faults in order to determine which middleware source should be selected for use.

In some embodiments, the network server may determine that one or more of the middleware sources exceeds a time threshold for processing node data. For example, the determination may be based on the network server comparing two time stamps, referencing a threshold value stored in memory, and when the difference of the two time stamps exceeds the time threshold for a defined period of time, the network server may confirm that the threshold has been exceeded. In response to determining that the time threshold has been exceeded, the network server may independently analyze the quality of the node data by creating a control node data set. Prior to creating the control node data set, the network server may generate a pull request to retrieve raw node data, where the pull request establishes a communication path (e.g., path 140) that bypasses the one or more middleware sources and retrieves raw node data directly from the element management system.

At step 208, in response to the network server determining the fault and associated middleware source, the network server bypasses the middleware source associated with the fault and retrieves, via the network, raw node data directly from an element management system associated with the network node. For example, network server may establish communication path 140 via the network 130 such that the communication path bypasses one or more middleware sources. Bypassing the middleware sources to retrieve raw node data may be based on determining, by the network server, that each of the middleware sources produces a fault in a node data set, where the node data set pertains to the same network node.

In some embodiments, methods of the present disclosure may further comprise transforming, by the network server, the raw node data (which was retrieved directly from the element management system while bypassing the middleware sources) into a control node data set. Based on the control node data set, the network server may determine that one of the middleware sources produces fewer faults in the node data set than other middleware sources. For example, the network server may determine how many faults occur within the control node data set 156 and compare that with the number of faults present in the node data 181-183. The network server 150 may determine that node data B 182 has less faults than node data A 181 and node data C 183. Based on determining which middleware source has less faults than the others, the network server may select at least that one middleware source to be a primary conduit for the network server to use in analysis of node data sets. As used herein, the term "conduit" refers to a communication path by which the network server uses to receive and implement when analyzing node data sets. For example, because node data 181-183 may pertain to the same network node (e.g., eNB 104), application 154 could analyze each node data 181-183 to determine conditions about how the network node is performing. However, since the network server determined which middleware source produces high quality data (e.g., by having less faults than other node data produced by the rest of the middleware sources), the application 154 may look to node data B 182 first, and thus in turn middleware source B 122 would become the primary conduit.

Based on selecting a middleware source as the primary conduit (e.g., middleware source B 122), the network server may redirect an application on the network server (e.g., application 154) to use the at least one middleware source (e.g., middleware source B 122) as the primary conduit for analyzing node data sets. For example, application 154 may apply a weighted value to node data B 182 so as to treat data coming from middleware source B 122 as being of higher quality than another (lower) weighted value to node data A 181 and node data C 183 which correspond to middleware source A 120 and middleware source C 124 respectively. Thus, application 154 relies on middleware source B 122 as its primary conduit by using node data B 182 due to it having higher weight value than given to the node data 181, 183 from the other middleware sources 120 and 124, respectively. In some embodiments, the middleware sources that are not the primary conduit may be referred to as subordinate conduits and may be given a lower weight value. Thus, when network server 150 generates a performance report about a network node, the node data used in the performance report may be based on node data from the primary conduit (e.g., node data B 182). By this, network server 150 optimizes the retrieval of node data by only having to look to particular sources which have been determined to be of higher quality. In some embodiments, the network server may, after passage of a defined amount of time, reevaluate whether the selected middleware source should remain the primary conduit. The network server may repeat at least some of the analysis discussed in the methods and system presented herein for determination of whether another middleware source should be used, and/or how long the selected middleware source should remain the primary conduit.

Turning now to FIG. 3, a method 300 for optimizing retrieval of node data from network nodes is disclosed. The example method 300 may be implemented using, for example, the network server 150 described above with respect to at least FIG. 1. The method 300 comprises step 302 of receiving, by a network server communicatively coupled with a network, a node data set comprising node data from a plurality of middleware sources. Each of the plurality of middleware sources may include one or more computer servers that receive raw node data 174 coming from a network node (e.g., cell site 104), process and transform the raw node data 174 into node data (e.g., one of node data 181-183), and transmit the node data to the network server 150. For example, as UE 102 communicates with network 130 via cell site 104, the element management system A 110 may create raw node data 174 about the activity that occurs at cell site 104. This raw node data 174 is then sent each middleware source 120-124. Middleware sources 120-124 may process the raw node data 174 and each middleware source 120-124 may send node data 181-183 to diagnostic data store 170. This means that each middleware source may process the same raw node data 174 that is coming from the same element management system (e.g., element management system A 110). Although the same raw node data 174 is processed, the resulting node data 181-183 may not be identical, and thus each middleware source 120-124 provides their raw node data 181-183 to the network server 150 and/or diagnostic data store 170 for storage within node data set 180. The diagnostic data store 170 stores the node data 181-183 as a node data set 180 via a data structure.

At step 304, the network server is determining a plurality of faults in the node data set. For example, at least one of the faults may correspond with at least one of: a gap in data continuity about the node, indication of a middleware source exceeding a time threshold for node data being processed and reported to the network server, or a combination thereof. Each node data set stored in the diagnostic data store (e.g., node data set 180 stores diagnostic data store 170) may comprise identifiers of the middleware source that provided node data for the node data set (e.g., middleware sources 120-124 providing node data 181-183, respectively, for node data set 180).

At step 306, the method 300 includes identifying, by the network server, each middleware source associated with at least one of the plurality of faults. In some embodiments, the node data set 180 comprises time stamps, and each time stamp may be assigned to node data coming from one of the middleware sources (e.g., node data 181-183 coming from middleware sources 120-124, respectively). For example, the network server 150 may identify which middleware source the time stamps pertain to (such as time stamps in node data 182 pertaining to middleware source B 122) via embedded identifiers (e.g., identifiers within node data 181-183). In some embodiments, the time stamps may correspond to at least one of: a time in which an element management system (e.g., element management system A 110) created the raw node data 174; a time for which one of the plurality of middleware sources (e.g., one of 120-124) processes the raw node data 174; and a time the node data (e.g., 181-183) is available for analysis by the network server 150.

At step 308, the method 300 includes determining, by the network server, a historical frequency of faults in node data provided by the middleware source. For example, the network server 150 may execute application 154 to determine a baseline of faults using historical node data sets 172. The baseline of faults may be calculated by the network server analyzing the historical node data sets 172 and determining an average of faults for each middleware source (e.g., each middleware source 120-124). The network server 150 may create a threshold corresponding to the historical frequency of faults, and store it as a value corresponding to one of the thresholds 176 in diagnostic data store 170. The threshold for the historical frequency of faults corresponds with how many times a middleware source (e.g., one of middleware sources 120-124) exceeds thresholds pertaining to time and gaps in the data (i.e., data discontinuities). For example, the plurality of thresholds 176 may comprise a time threshold and a discontinuity threshold. The threshold corresponding to the historical frequency of faults may determine whether the number of faults produced by one of the middleware sources has exceeded a time threshold and a discontinuity threshold over a defined time period. The time threshold corresponds to the time it takes for a middleware source to transform raw data into node data and send the node data to the network server 150 and/or diagnostic data store 170.

Regarding the network server's analysis of node data with respect to a time threshold, in some embodiments, the network server may compare time stamps corresponding with when each node data set is available versus when the raw node data was created. The difference between the two time stamps yields a time differential value that the network server 150 uses to compare with a time threshold stored as a value in diagnostic data store 170. In some embodiments, the time threshold may be higher and/or lower from the baseline value, and thus deviations may be measured from the baseline and compared to determine if the time value exceeded the time threshold. The network server 150 may determine that the middleware source exceeds the time threshold for processing the raw node data 174 due to the calculated time differential in the node data being greater than the time threshold. For example, threshold 176 may include a time threshold with a stored value of sixty minutes, and the network server 150 may detect that middleware source B 122 took seventy minutes to produce and transmit node data B 182. Thus, the network server 150 may calculate that the time threshold for middleware source B 122 was exceeded by ten minutes, thereby indicating that the time threshold was exceeded. In some embodiments, exceeding the time threshold may trigger the network server 150 to take a specific action, such as determining whether other middleware sources are exceeding time thresholds corresponding to the node data they produce. In response to one of the thresholds 176 being exceeded, the network server may obtain raw node data stored in the element management system A 110 without using a middleware source as an intermediary conduit (i.e., by establishing a communication path that bypasses a middleware source, such as communication path 140 that bypasses middleware sources 120-126).

In some embodiments, the network server may determine that a discontinuity threshold has been exceeded. A discontinuity threshold may be a value stored in diagnostic data store 170 as one of the thresholds 176. Each middleware source may have its own stored value for the discontinuity threshold, where the discontinuity threshold corresponds to a defined deviation from the amount of gaps in node data that the middleware source produces on average (i.e., a defined deviation from a baseline value for the average amount of gaps produced). For example, middleware source A 120 may produce node data A 181 that comprises an average of fifteen gaps per defined time period. The network server may assign a discontinuity threshold as a value greater than the average amount of gaps, and thus in this example, the discontinuity threshold may be a stored value of twenty gaps (which is five above the average number of gaps).

At step 310, the method 300 continues with the network server detecting that a threshold for the historical frequency of faults (also referred to as a historical fault frequency threshold) has been exceeded. For example, the network server 150 may determine how many times one of the middleware sources (e.g., any of middleware sources 120-124) exceeds a time threshold for processing the raw node data and/or exceeds a discontinuity threshold corresponding to the amount of gaps in node data within the node data set. The historical frequency threshold may correspond with a defined value indicating that the time threshold and/or discontinuity threshold have been exceeded (for a particular middleware source 120-124) so frequently that the quality of the corresponding node data (e.g., node data 181-183) may be questioned. Put simply, the time thresholds and/or discontinuity thresholds may be exceeded, but the number of times in which they are exceeded may be rare and/or infrequent. By analyzing historical node data sets 172 with respect to the historical frequency threshold stored as a value in thresholds 176, the network server 150 can determine that processing faults are becoming less rare and/or infrequent due to the historical fault frequency threshold being exceeded (i.e., the rate at which the time threshold and/or discontinuity threshold is being exceeded becomes greater than an average over a defined time period).

At step 312, the method 300 continues such that in response to determining that a threshold for the historical frequency of faults has been exceeded, bypassing, by the network server via the network, each middleware source associated with a fault and retrieving raw node data directly from an element management system associated with a network node. As such, the network server may first be determining that a threshold for the historical frequency of faults has been exceeded. For example, the network server 150 determines that the middleware source C 124 exceeds a time threshold for processing the raw node data 174 and exceeds a discontinuity threshold corresponding to the amount of gaps in node data 183 within the node data set 180. Over a defined period of time, such as one month, the network server 150 may determine that the middleware source exceeded the time threshold five times and discontinuity threshold three times. The network server 150 determines that the threshold for the historical frequency of faults permits middleware source C 124 to exceed the time threshold three times and discontinuity threshold once over the one month time period. Once the threshold for historical frequency is exceeded, the network server may take an action in response. It is understood that other middleware sources (e.g., middleware source A 120 and middleware source B 122) may have different thresholds for historical frequency of faults as measured over the same defined time period. By this, the network server 150 may determine that middleware source C 124, for example, is exceeding its thresholds at a rate greater than middleware source A 120 and middleware source B 122.

Once the network server 150 determines that a threshold has been exceeded, such as the threshold for the historical frequency of faults, the network server 150 may verify the quality of node data produced by the middleware sources. In some embodiments, the method 300 includes the network server establishing a communication path via the network so as to bypass each middleware source associated with a fault and/or threshold that was exceeded. The method 300 includes the network server retrieving raw node data directly from an element management system associated with a network node. For example, raw node data 174 is originally created and stored in element management system A 110 before being sent to middleware sources 120-124 and in some embodiments copied to diagnostic data store 170. The network server 150 may bypass middleware sources 120-124 by establishing communication path 140 and retrieve raw node data directly from element management system A 110 (i.e., without using any of the middleware sources as intermediaries). In some embodiments, once the network server receives raw node data from the element management system, the network server processes and transforms the raw node data into a control node data set 156.

At step 314, the method 300 continues with the network server redirecting at least one of the plurality of middleware sources to be a primary conduit for the network server to use in analysis of node data sets. For example, based on comparing any faults in the control node data set 156 with those found in node data produced by the middleware sources (e.g., node data 181-183), the network server may select one or more middleware sources to be a primary conduit for providing node data used in analysis of the performance of network nodes. Put simply, the primary conduit indicates which middleware source will be considered as an intermediary that provides higher quality node data than other middleware sources. By this, the application 154 may rely on node data produced by one of the middleware sources when creating performance reports based on the relative higher quality (i.e., less gaps and/or faster processing time). The selection of one of the middleware sources to be primarily used over other middleware sources may optimize retrieval of node data due to the network server obtaining and analyzing only particular node data from a node data set (e.g., only node data A 181 from node data set 180), thereby decreasing access time and increasing the speed with which node data is analyzed. In some embodiments, the network server may initiate a reboot of one or more of the plurality of the middleware sources (e.g., any of middleware sources 120-124) so as to reset the servers that may be contributing to faults in the node data. This may improve the functioning of the servers of the middleware sources and yield more reliable node data due to less gaps being present. In some embodiments, when faults are detected by network server 150 in excess of one of the thresholds 176, the network server 150 may transmit an alert message to a vendor server 160 and identify which middleware source (e.g., one or more of middleware sources 120-126) is experiencing faults.

Turning now to FIG. 4, another example method 350 for optimizing retrieval of data from network nodes is disclosed. The method 350 may be implemented on embodiments of system 100 as discussed with respect to FIG. 1, such as via execution of application 154 on network server 150. The method 350 comprises step 352 with the network server, which is communicatively coupled to a network, obtaining a plurality of node data sets from a plurality of middleware sources. Each of the plurality of node data sets comprise node data pertaining to a network node in the network. For example, node data set 180 pertains to one network node, such as cell site 104. Node data is produced by each middleware source (e.g., node data 181-183 from middleware sources 120-124, respectively) and node data comprises at least one of performance data, operational data, or a combination thereof, such as discussed with respect to FIG. 1 in system 100.

The method 350 continues at step 354 with the network server determining a fault in at least one node data set. In some embodiments, the fault in the at least one node data set corresponds with at least one of: a lack of data continuity about the node (i.e., gaps in node data); an indication of exceeding a time threshold for data being reported to the network server, or a combination thereof. When the network server determines that a time threshold has been exceeded, the network server identifies the middleware source associated with the fault to be repeatedly delayed in reporting node data to the network server and/or diagnostic data store, where the delay is relative to the time it takes for at least one of the other middleware sources (which also produces node data based on the same raw node data about a network node) to report node data to the network server for inclusion in a node data set.

The method 350 comprises step 356 with the network server identifying the middleware source associated with the fault in the at least one node data set, such as via an identifier in the node data. The network server may also identify an element management system that provided raw node data to the middleware source which produced the fault during transformation from the raw node data into node data included in a node data set. For example, the network server 150, via execution of application 154, may determine that node data B 182 has faults which merit further investigation (e.g., due to exceeding a threshold). The network server 150 may map an identifier in node data B 182 with a list of known middleware sources, and identify middleware source B 122 as producing node data B 182. In turn, the network server 150 may identify that the node data B 182 was produced based on raw node data from element management system A 110, which generated the raw node data based on the communications and activity of a network node, such as cell site 104.

At step 358, the network server uses the identification of the middleware source(s) and/or element management system as a basis for retrieving raw node data directly from the element management system associated with the network node (i.e., the network node is retrieving raw node data from the identified element management system while bypassing the identified middleware source(s) associated with the fault, and thus not using the middleware source(s) as an intermediary). For example, conventionally middleware sources 120-126 would be used as conduits (i.e., intermediary devices along communication paths) for obtaining information about network nodes, and thus rely on middleware sources 120-126 to extract raw node data, transform it into node data that is more conducive to analysis by the network server, and load the node data into memory accessible to the network server (e.g., memory 152 of network server 150 and/or diagnostic data store 170). In bypassing the middleware sources, the network server 150 is able to optimize retrieval of node data by independently verifying which middleware source(s) produces the highest and/or most reliable quality node data (i.e., node data with the least amount of gaps over a defined time period) and selecting one or more middleware sources to be used over others when creating performance reports and/or detecting processing errors within the communication network.

In some embodiments, the network server may transform the raw node data into one or more node data sets in response to retrieving node data from the element management system. Each node data set created by the network server (via the transformation) may correspond to a particular network node and/or element management system. For example, the network server may create control node data set 156 via transformation of raw node data 174 that was originally stored in the memory of element management system A 110. In some embodiments, the network server may determine how long it took to create the control node data set(s). Then, network server may compare the time stamps of when each of the plurality of node data arrives at the data store from the middleware sources versus when the raw node data was created by the element management system and sent to the middleware sources for processing and transformation into node data. Put simply, when determining whether the amount of faults is unusually high, the network server may calculate how long it took for each middleware source (e.g., middleware sources 120-124) to transform raw node data 174 into node data 181-183 and send it to network server 150 and/or diagnostic data store 170 for analysis.

In some embodiments, the network server may determine that one of the middleware sources (e.g., middleware source B 122 associated with faults in node data 182) exceeds a time threshold for processing the node data (e.g., node data 182). Because the time threshold is exceeded, the network server may determine that the middleware source associated with the fault (e.g., middleware source B 122) is repeatedly delayed in reporting node data (e.g., node data 182) to the network server when compared to the time it takes another middleware source (e.g., middleware source A 120) to report node data (e.g., node data 181) to the network server and/or the time it takes network server 150 to create control node data set 156. Based on the determination that one or more threshold is exceeded and/or which middleware source produces the highest quality data, the network server may select at least one of the middleware sources to be a primary conduit for providing node data to the network server. Put simply, the primary conduit corresponds with the network server trusting one middleware source more than others to function as an intermediary for transforming raw node data into node data for analysis due to the selected middleware source transforming the data with fewer gaps and/or in a faster time than other middleware sources (i.e., providing higher quality data).

At step 360, the method 350 continues such that in response to the network server retrieving the raw node data while bypassing the middleware sources (and thus without the middleware sources serving as an intermediary), the network server redirects an application (e.g. application 154) to use one or more middleware source as the primary conduit in the analysis of node data sets. For example, when application 154 is requested to create a performance report about the processing efficiency of network node 104, the application may use node data set 180 as a basis for generating the report. Because the network server redirects application 154 to use middleware source B 122, for example, as the primary conduit, then application 154 may pull and use node data B 182, which corresponds to middleware source B 122, in the analysis and generation of the report. By this, middleware source A 120 and/or middleware source C 124 (along with corresponding node data A 181 and node data C 183, respectively) may be assigned as secondary or subordinate conduit, and their data may be given less weight and/or not used in the generation of reports and/or determination of whether processing errors are within acceptable levels on the network. This may optimize the retrieval of node data from a node data set and improve the efficiency with which network server creates and detects errors because the network server processes and analyzes the node data from the primary conduits alone rather than also having to process node data from other middleware sources as well. In some embodiments, the network server may reboot one or more of the middleware sources associated with a fault in the node data it produces.

Figure 5:
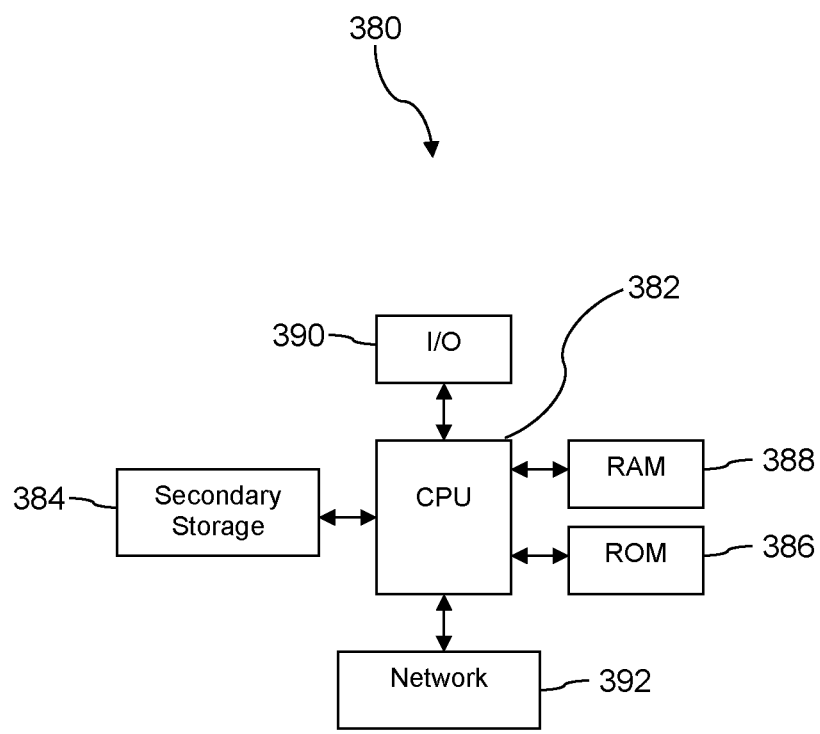
FIG. 5 illustrates an exemplary computer system suitable for implementing the several embodiments of the disclosure.

FIG. 5 illustrates a computer system 380 suitable for implementing one or more embodiments disclosed herein, such as features of system 100 in FIG. 1, including one or more UE 102, middleware sources 120-126, network server 150, vendor server 160, diagnostic database 170, element management systems 110, 112, network nodes 104, 106, and operations disclosed in FIGS. 2, 3, and 4. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. It is understood that use of the term "memory" in the claims does not include transitory signals. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine, sometimes referred to as a special purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprised on one or more non-transitory computer readable storage medium having computer usable program code embodied therein to implement the functionality disclosed above. The computer program product may comprise data structures, executable instructions, and other computer usable program code. The computer program product may be embodied in removable computer storage media, non-removable computer storage media, or any combination therein. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for optimizing retrieval of data from network nodes, the method comprising:

obtaining, by a network server communicatively coupled with a network, a plurality of node data sets from a plurality of middleware sources, wherein each of the plurality of node data sets comprises node data pertaining to the same network node in the network;

determining, by the network server, a fault in node data of at least one node data set;

identifying, by the network server, the middleware source associated with the fault in the at least one node data set and identifying an element management system that provided raw node data to the middleware source;

based on the identifying, retrieving, by the network server, raw node data from the element management system associated with the network node while bypassing the middleware source associated with the fault; and in response to retrieving the raw node data, redirecting, by the network server, an application to use at least one of the plurality of middleware sources as a primary conduit in analysis of node data sets.

2. The method of claim 1, wherein node data in the plurality of node data sets comprises performance data and operational data corresponding to the same network node.

3. The method of claim 1, further comprising rebooting, by the network server via the network, one of the plurality of middleware sources associated with the fault.

4. The method of claim 1, wherein the fault in the at least one node data set corresponds with at least one of: a lack of data continuity about the node, indication of exceeding a time delay threshold for data being reported to the network server, or a combination thereof.

5. The method of claim 1, further comprising:
in response to retrieving the raw node data from the element management system, transforming, by the network server, the raw node data into node data;
based on the transformed node data sets, comparing, by the network server, time stamps of when node data arrives at a data store from the middleware sources with when raw node data was created by the element management system;
determining, by the network server, that the middleware source exceeds a time threshold for processing the node data sets which indicates that the middleware source is repeatedly delayed in reporting node data;
determining, by the network server, that the middleware source associated with the fault is repeatedly delayed in reporting node data to the network server compared to at least one of the plurality of middleware sources that also reports node data to the network server; and
selecting at least one of the plurality of middleware sources to be a primary conduit based on retrieving the raw node data.

6. A method for optimizing retrieval of node data from network nodes, the method comprising:
receiving, by a network server communicatively coupled with a network, a node data set comprising node data from a plurality of middleware sources;
determining, by the network server, a plurality of faults in the node data set;
identifying, by the network server, each middleware source associated with at least one of the plurality of faults;
determining, by the network server, a historical frequency of faults in node data provided by the middleware source;
detecting, by the network server, that a threshold for the historical frequency of faults has been exceeded;
in response to determining that the threshold for the historical frequency of faults has been exceeded,
bypassing, by the network server via the network, each middleware source associated with a fault and retrieving raw node data directly from an element management system associated with a network node; and
redirecting, by the network server, at least one of the plurality of middleware sources to be a primary conduit for the network server to use in analysis of node data sets.

7. The method of claim 6, wherein each middleware source processes raw node data from the same element manage system and provides node data to the network server.

8. The method of claim 6, wherein at least one fault corresponds to at least one of: a gap in data continuity about the node, indication of exceeding a time threshold for node data being processed and reported to the network server, or a combination thereof.

9. The method of claim 6, wherein each of the plurality of middleware sources include computer servers that receive raw node data from a network node, process and transform the raw node data into node data, and transmit the node data to the network server.

10. The method of claim 6, wherein each of the node data sets comprises time stamps corresponding to times at which an element management system created the raw node data, the time one of the plurality of middleware sources processes the raw node data, and the time node data is available for analysis by the network server.

11. The method of claim 10, further comprising:
comparing, by the network server, time stamps of when each of the plurality of node data sets is available with when the raw node data was created; and
determining, by the network server, that the middleware source exceeds a time threshold for processing the raw node data and exceeds a discontinuity threshold corresponding to the amount of gaps in node data within the node data set.

12. The method of claim 6, further comprising rebooting one of the plurality of middleware sources.

13. A method for optimizing retrieval of node data from network nodes that include cell sites, the method comprising:
obtaining, by a network server via a network, a node data set comprising node data from a plurality of middleware sources, wherein each of the plurality of middleware sources provides node data about the same network node;
determining, by the network server, a fault in the node data received from one of the plurality of middleware sources;
identifying, by the network server, the middleware source that is associated with the fault; and
in response to determining the fault and associated middleware source, bypassing, by the network server via the network, the middleware source associated with the fault and retrieving raw node data directly from an element management system associated with the network node.

14. The method of claim 13, wherein bypassing one or more middleware sources is based on determining, by the network server, that each of the middleware sources produces a fault in the node data sets that pertain to the same network node.

15. The method of claim 13, wherein the fault corresponds to at least one of a gap in data continuity about the network node, an indication of a middleware source exceeding a time threshold for processing and reporting node data to the network server, or a combination thereof.

16. The method of claim 13, wherein the network server periodically updates the node data set with node data received from each middleware source.

17. The method of claim 13, further comprising:
comparing, by the network server, an arrival time of when node data arrives at the network server from the middleware sources with a sent time of when node data was sent to the middleware sources from the element management system;
determining, by the network server, that one or more of the middleware sources exceed a time threshold for processing node data; and
in response to determining the time threshold has been exceeded, generating, by the network server, a pull request for bypassing one or more middleware sources to retrieve raw node data.

18. The method of claim 13, further comprising:
identifying an element management system associated with the node data set;
generating a key to access the element management system; and
accessing the element management system to obtain raw node data based on the key.

19. The method of claim 13, further comprising:
transforming, by the network server, the raw node data retrieved directly from the element management system into a control node data set;
based on the control node data set, determining, by the network server, that one of the middleware sources produces less faults in the node data set than other middleware sources;
based on the determining, selecting, by the network server, at least one middleware source to be a primary conduit for the network server to use in analysis of node data sets; and
based on the selecting, redirecting, by the network server via the network, an application on the network server to use the at least one middleware source as the primary conduit for analyzing node data sets.

20. The method of claim 13, wherein the network node comprises a cell site; and wherein each middleware source includes a computer server that is transforming raw node data into node data that is loaded into the node data set for the network server.

\* \* \* \* \*